United States Patent Office 3,540,957
Patented Nov. 17, 1970

3,540,957
CERAMIC BONDING
Mohendra S. Bawa, Dallas, Leslie O. Connally, Arlington, and James K. Truitt, Dallas, Tex., assignors to Texas Instruments Incorporated, Dallas, Tex., a corporation of Delaware
No Drawing. Filed Oct. 5, 1966, Ser. No. 584,359
Int. Cl. C04b 37/00
U.S. Cl. 156—89                 2 Claims

---

ABSTRACT OF THE DISCLOSURE

Ceramic parts such as aluminum oxide or magnesium oxide are bonded together by interposing a mixture of about 85 to 95 weight percent aluminum and about 15 to 5 weight percent zinc or zinc oxide between the parts and firing the mixture to about 900–1200° C. in an oxidizing atmosphere.

---

This invention relates to a composition for bonding ceramic parts and the method of making the same. More particularly it relates to an improved mixture of aluminum and zinc or zinc oxide for bonding ceramic parts.

Aluminum oxide $Al_2O_3$ and magnesium oxide MgO ceramic parts are used in environments involving high temperatures and corrosive materials due to their inherent ability to withstand such hostile conditions. One such application is in high temperature molten carbonate fuel cells. In the past there has been the problem of bonding the aluminum oxide and magnesium oxide ceramic parts. Presently available bonding compositions are subject to attack by the highly corrosive carbonate electrolyte, thereby deteriorating quite rapidly and destroying the bond.

With these difficulties in mind it is an object of this invention to provide a high temperature cement having good corrosion resistance to molten carbonate attack and high electrical resistivity for bonding aluminum oxide or magnesium oxide parts.

It is another object of the invention to provide a method of preparing a high temperature cement for use in bonding together aluminum oxide and magnesium oxide ceramics.

In accordance with these and other objects, features, and advantages, the invention involves an improved high temperature cement composed of aluminum and zinc or zinc oxide powders. In the preferred embodiment of the invention the cement is prepared by mixing approximately 5% by weight of zinc or the equivalent of zinc oxide powder, with 95% by weight of aluminum powder. The mixed powder is formed into a pellet by subjecting it to high pressure. To form a seal between such ceramics as aluminum oxide or magnesium oxide, the pellet is placed between the parts to be sealed together and heated in an oxidizing atmosphere. Under these conditions the pellet bonds the ceramic parts together.

The following example serves to illustrate the invention, but the invention is not limited thereto:

A mixture comprising 95% aluminum powder by weight (150 mesh) and 5% zinc powder by weight (120 mesh) or the equivalent of zinc oxide, is prepared by dry blending in a conventional blender until a homogeneous mixture is obtained. The mesh size of the powders is not critical to the invention and can be varied considerably.

The mixed powder is then formed into a pellet, the dimensions of which are defined by the dimensions of the ceramic parts to be bonded together, by the application of approximately 10,000 lbs. per square inch of pressure in a conventional pellet press.

To form the bond between the ceramic parts to be bonded, the compacted pellet or, if desired, the powdered mixture, is placed between the two ceramic parts to be bonded and fired in an oxidizing atmosphere for approximately 4 hours at about 900° C. to about 1200° C. The fired parts can be quickly cooled to room temperature without destroying the bond. The firing time is not critical and can be varied greatly without changing the desired physical properties of the bond.

By using the method described above the following electrical resistance results are obtained by varying the percentage of zinc in the mixture:

| | Percent zinc by weight |
|---|---|
| Resistance of about 0.1 ohm-cm. | 0.4 |
| Resistance of about 0.1 ohm-cm. | 1.0 |
| Resistance of about 1 megohm-cm. | 5.0 |
| Resistance of about 1 megohm-cm. | 10.0 |
| Resistance of about 1 megohm-cm. | 15.0 |

As the zinc content is increased to over about 15% by weight, the shrinkage resulting from firing the mixture increases to such an extent as to make the cement unusable. On the other hand the resistance decreases to an undesirable value when the percentage of zinc drops much below 5%.

The high content of aluminum oxide (formed by oxidizing a portion of the aluminum starting material) causes the cement to have a thermal expansion in the range of the aluminum oxide parts to be bonded.

Although magnesium oxide has a thermal expansion approximately twice that of aluminum oxide ($140 \times 10^{-7}$ ° C. for MgO as opposed to $63 \times 10^{-7}$ ° C. for $Al_2O_3$), the mixture of this invention forms a very stable bond between the ceramic parts. Due to the higher thermal expansion of the magnesium oxide ceramic parts to be bonded, the bonding mixture will be placed in compression upon cooling from the firing temperature. As is well known in the art, ceramics exhibit their greatest strength while in compression. Aluminum oxide and magnesium oxide parts approximately ⅛" thick which were bonded by the mixture of this invention broke apart without harming the bond upon application of tensile forces perpendicular to the bond.

While the invention has been described with reference to the above described method and embodiments, it is to be understood that this description is not to be construed in a limiting sense. Various modifications of the invention will become apparent to persons skilled in the art without departing from the spirit and scope of the invention as defined by the appended claims.

What is claimed is:

1. The method of making a high resistance, high temperature bond to ceramic parts of aluminum oxide consisting of the steps of:
   (a) forming a mixture consisting of aluminum and zinc, said zinc comprising from 5% to 15% by weight of the mixture, the remainder of said mixture consisting of said aluminum;
   (b) pressing said mixture at about 10,000 pounds per square inch to form a pellet thereof, said pellet substantially conforming to the area of said parts to be bonded together; and
   (c) interposing said pellet between said ceramic parts and bonding said pellet to said ceramic parts by firing said pellet and ceramic parts at about 900° C. to about 1200° C. in an oxidizing atmosphere, said bond exhibiting thereafter an electrical resistance of about one megohm-centimeter.

2. The method of making a high resistance, high temperature bond to ceramic parts of magnesium oxide consisting of the steps of:
   (a) forming a mixture consisting of aluminum and zinc, said zinc comprising from 5% to 15% by weight of the mixture, the remainder of said mixture consisting of said aluminum;

(b) pressing said mixture at about 10,000 pounds per square inch to form a pellet thereof, said pellet substantially conforming to the area of said parts being bonded together; and (c) interposing said pellet between said ceramic parts and bonding said pellet to said ceramic parts by firing said pellet and ceramic parts at about 900° C. to about 1200° C. in an oxidizing atmosphere, said bond exhibiting thereafter an electrical resistance of about one megohm-centimeter.

References Cited

UNITED STATES PATENTS

| | | | |
|---|---|---|---|
| 2,511,551 | 6/1950 | Smith et al. | 75—146 |
| 2,602,413 | 7/1952 | Miller | 75—146 |
| 3,184,370 | 5/1965 | Luks. | |
| 3,244,539 | 4/1966 | Hare | 106—65 |
| 3,281,309 | 10/1966 | Ross | 65—43 |
| 3,311,464 | 3/1967 | Blomberg | 75—.5 |

FOREIGN PATENTS 227,836  8/1959  Autralia.

CARL D. QUARFORTH, Primary Examiner

H. E. BEHREND, Assistant Examiner

U.S. Cl. X.R.

106—39; 65—59, 43; 75—0.5, 208, 224